United States Patent [19]

Wang et al.

[11] Patent Number: 4,876,688
[45] Date of Patent: Oct. 24, 1989

[54] FREQUENCY DOUBLING CRYSTALS

[75] Inventors: Francis Wang, Danville; Stephan P. Velsko, Livermore, both of Calif.

[73] Assignee: The United States of America as represented by the Secetary of the Department of Energy, Washington, D.C.

[21] Appl. No.: 232,200

[22] Filed: Aug. 15, 1988

[51] Int. Cl.$^4$ .............................................. H01S 3/10
[52] U.S. Cl. ........................................ 372/22; 372/21; 307/425; 307/427; 252/589; 252/600
[58] Field of Search ................. 372/21, 22; 307/425, 307/427; 252/589, 600

[56] References Cited

U.S. PATENT DOCUMENTS

| | | | |
|---|---|---|---|
| 3,679,907 | 7/1972 | Bonner et al. | 307/425 |
| 3,858,124 | 12/1974 | Bass et al. | 332/7.51 |
| 3,895,242 | 7/1975 | Yoshida | 307/425 |
| 4,041,323 | 8/1977 | Stürmer | 307/425 |
| 4,199,698 | 4/1980 | Bethea et al. | 307/425 |
| 4,376,899 | 3/1983 | Chemla et al. | 307/425 |
| 4,605,869 | 8/1986 | Choe | 307/425 |
| 4,622,409 | 11/1986 | Nicoud et al. | 548/570 |
| 4,694,048 | 9/1987 | Choe | 525/376 |
| 4,697,100 | 9/1987 | Eimerl | 307/427 |
| 4,707,303 | 11/1987 | Buckley et al. | 252/583 |
| 4,714,838 | 12/1987 | Harelstad et al. | 307/427 |
| 4,719,281 | 1/1988 | Choe | 307/425 |
| 4,733,109 | 3/1988 | Palazzotto | 307/427 |
| 4,756,598 | 7/1988 | Gerbi et al. | 307/427 |
| 4,779,961 | 10/1988 | DeMartino | 307/425 |
| 4,783,151 | 11/1988 | Choe | 307/425 |

OTHER PUBLICATIONS

Eimerl, D., "High Average Power Harmonic Generation", Reprinted from: IEEE Journal of Quantum Electronics, vol. QE-23, No. 5, May 1987; pp. 575-592.
Velsko, Stephan P. "Direct Assessment of the Phase Matching Properties of New Nonlinear Materials", submitted to Society of Photo-Optical Instrumentation, Aug. 1986.
Kurtz, S., "Measurement of Nonlinear Susceptibilities", in "Quantum Electronics", vol. 1A 1975; pp. 209-280.
Nicoud, J. F. and Tweig, R. J., "Design and Synthesis of Organic Molecular Compounds for Efficient Sound Harmonic Generation", in Nonlinear Optical Properties of Organic Molecules and Crystals, vol. 1, 1987; pp. 227-296.
Milam, D., "Laser Damage in Optical Crystals", in The Laser Program Annual Report, UCRL-50021-85, (1986).
"Organic Nolinear Crystals and High Power Frequency Conversion" SPIE vol. 824, Advances in Nonlinear Polymers and Inorganic Crystals, Liquid Crystals, and Laser Media (1987); Velsko et al.; pp. 178-181.

Primary Examiner—William L. Sikes
Assistant Examiner—Xuân Thi Võ
Attorney, Agent, or Firm—Clifton E. Clouse, Jr.; Roger S. Gaither; Judson R. Hightower

[57] ABSTRACT

A systematic approach to the production of frequency conversion crystals is described in which a chiral molecule has attached to it a "harmonic generating unit" which contributes to the noncentrosymmetry of the molecule. Certain preferred embodiments of such harmonic generating units include carboxylate, guanadyly and imidazolyl units. Certain preferred crystals include L-arginine fluoride, deuterated L-arginine fluoride, L-arginine chloride monohydrate, L-arginine acetate, dithallium tartrate, ammonium N-acetyl valine, N-acetyl tyrosine and N-acetyl hydroxyproline. Chemical modifications of the chiral molecule, such as deuteration, halogenation and controlled counterion substitution are available to adapt the dispersive properties of a crystal in a particular wavelength region.

20 Claims, 1 Drawing Sheet

FREQUENCY DOUBLING CRYSTALS

This invention was made in the course of or under prime Contract No. W-7405-ENG-48 between the U.S. Department of Energy and the University of California.

BACKGROUND OF THE INVENTION

The present invention relates to the use of crystalline organic molecules in non-linear optics. More particularly, this invention relates to the use of a chiral molecule having harmonic generating substituent groups.

Non-linear optics is means to cover those fields of optics in which one frequency of radiation is converted to another, and to electrooptical modulation of radiation, in which only one characteristic of the radiation is modified. Frequency conversion is obtained from the mixture of two radiations of different frequencies. The conversion is equal to the sum or the difference of frequencies of the incident radiations. Electrooptical modulation can be obtained by the application of an electrical field to a transparent crystal traversed by the radiation.

It is known from the prior art that inorganic crystals can be used to obtain frequency doubling. The most widely used frequency doubling crystals are based upon potassium diphosphate KDP or lithium niobate. KDP suffers from inadequate frequency conversion efficiency, thereby requiring the use of crystals of considerable thicknesses. Since the heat dissipation and thermal failure properties of the crystal are a function of its thickness, a shorter crystal is desirable. Lithium niobate cannot be grown in large sizes, and is not suitable for generating blue or ultraviolet light.

There is a continuing research effort to develop new nonlinear optical organic systems. Organic systems offer molecules with large delocalized $\pi$-electron systems which exhibit non-linear optical response, typically much greater than the response obtained from an inorganic molecule. Further, it is known that organic molecules can be modified to optimize other desirable physical properties to achieve high mechanical and thermooxidative stability, while preserving the desired non-linear optical response, useful for frequency conversion.

Examples of some organic compounds which have been identified are 13,13 —diamino—14,14 - dicyanodiphenoquinodimethane (U.S. Pat. No. 4,707,303), paranitroaniline derivatives (U.S. Pat. No. 4,622,409), and 3 and/or 5 —methyl—4 —nitropyridine—1 —oxide (U.S. Pat. No. 4,376,899.)

What is known generally about the frequency doubling crystals is that its molecule had to have a noncentrosymmetric crystal structure and have sufficient birefringence for phase matching. Non-centrosymmetric species are those which have no center of symmetry on either the molecular or crystalline unit cell level. Despite this generalization, there was no general method for identifying crystals with these properties which were also available for doubling the frequency into the blue or ultraviolet spectrum. Thus, finding new frequency conversion crystals was an empiric, hit or miss process.

The present invention establishes a way of constructing the candidate molecule to ensure these known required properties with high probability by disclosing a third, chemical criterion that is required for these crystals to have useful nonlinearities and optical transmission properties.

Specifically, this invention adds the requirement that frequency doubling crystals contain a "harmonic generating unit" with the following properties. The molecule, or molecular unit, must be intrinsically noncentrosymmetric itself in order to be a "harmonic generating unit." The unit must have relatively low energy electronic excitations which simultaneously possess both strong 1 and 2 photon dipole transition moments with the electronic ground state. The molecular unit must be anisotropic, e.g., planar or "one dimensional" in geometry. The harmonic generating unit must be transparent to visible and ultraviolet wavelengths. Optionally, the unit is formed from ionic materials so that crystals of the compound can be formed as salts with readily available anions and cations.

Crystals formed from chiral molecules containing such harmonic generating units are of necessity, non-centrosymmetric and have high probability of being very birefringent. Therefore, the first two requirements for harmonic generation are automatically met. These same properties also favor substantially nonlinear crystals which improve efficiency. The transparency condition on the harmonic generating units guarantees that crystals formed will be transparent to the doubled light.

The present invention provides frequency conversion crystals which are formed from organic chiral molecules having a harmonic generating unit which has optimum properties for doubling or mixing specific wavelengths and which lends itself to some degree of tailoring a crystal's phase matching properties by using certain chemical substitutions to change dispersion of the refractive index in the near infrared or near ultraviolet wavelengths. Examples of this chemical substitution are deuteration, halogenation and the substitution of cations and anions.

SUMMARY OF THE INVENTION

It is an object of the present invention to provide frequency conversion crystals which are useful to double near infrared or visible light into the blue or ultraviolet spectral region.

A further object of this invention is to provide a general method for deliberately producing frequency conversion crystals.

Another object of the present invention is to provide the capability to tailor the organic crystal's phase matching properties by using certain chemical substitutions to change dispersion of the refractive index in the near infrared or near ultraviolet.

Other objects of the invention will become readily apparent to those skilled in the art from the following description.

DETAILED DESCRIPTION OF THE INVENTION

Figure 1:
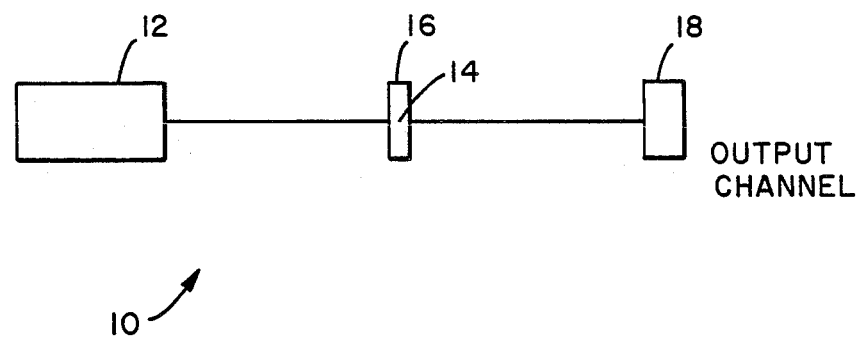
FIG. 1 is a schematic representative of a second harmonic generator according to the present invention.

New nonlinear optical organic systems will find use in devices adapted for laser frequency conversion, information control in optical circuitry, light valves and optical switches. These nonlinear optical devices are also useful in future high power, large aperture lasers such as those used for inertial confinement fusion experiments.

There are several properties, including nonlinearity and phasematching properties, which determine a particular compound's usefulness as a frequency conversion crystal. The optimization of a material for a specific frequency conversion application is determined by scaling laws. Each material can be characterized by a "threshold power" ($P_{th}$), which is approximately the smallest peak power a diffraction limited laser pulse must have to be doubled efficiently (>50%) by that material. A diffraction limited beam with a peak power greater than or equal to $P_{th}$ can be doubled with high efficiency regardless of how the beam aperture is changed by telescoping—as long as the crystal length is adjusted to compensate for the change in drive intensity. The threshold power is defined as:

$$P_{th} = \frac{(\text{gamma beta})^2}{C}$$

where C is proportional to the nonlinear coupling $d_{eff}$, and is expressed in $MW^{-1/2}$ and beta is the angular sensitivity ($cm^{-1}$/rad). Thus, a small angular sensitivity can be as important an attribute as a large nonlinear coupling because a larger length of crystal can be used to convert a given laser beam. By the threshold power criterion, any crystal which has a $P_{th}$ lower than the power available for the intended application will convert efficiently.

Threshold power is not the only characteristic used to determine a material's suitability for nonlinear optical applications. For each material, there are several undesirable processes which may limit the allowable drive intensity, and hence the minimum device aperture. Correspondingly, this will limit the minimum crystal length sufficient for efficient conversion. Thus, aperture limiting process give each material a characteristic minimum volume necessary to produce efficient frequency conversion without exceeding the threshold for these undesirable effects. The cost of producing the minimum volume of each material is an unambiguous figure of merit for distinguishing between materials with similar threshold powers.

The major intensity (aperture) limiting processes are: optical damage, usually characterized by a damage fluence $J_D$; two photon absorption; stimulated Raman Brillouin scattering, characterized by a gain coefficient $g_s$; and self focusing or self phase modulation which depends on the nonlinear refractive index $n_2$. The last three processes are usually a consequence of the intrinsic chemical composition of the material, but the damage threshold is more often determined by the presence of inclusions or defects incorporated during crystal growth.

Another important material parameter is the linear absorption coefficient at the fundamental harmonic wavelengths. Small amounts of linear absorption can become problematic when high average powers are present. For two materials with comparable absorption coefficients, the shorter crystal will absorb less total energy. In many cases, a smaller aperture will favor easier heat removal. Beyond these simple considerations, the avoidance of thermal problems depends upon the thermal fracture limit and the coefficient of thermal dephasing of the material. See D. Eimerl, "High Average Power Second Harmonic Generation," I.E.E.E. J. Quant. Electron. QE-23, 575 (1987).

A large number of useful second harmonic generating crystals can be produced from molecular units composed of small, conjugated, ionic groups attached to chiral carbon centers. When these harmonic generating groups are intrinsically acentric, they have much higher hyperpolarizabilities than nonconjugated units, such as the phosphate ion. Crystals containing these chiral molecules can be grown from aqueous solution as salts with various counterions, or as zwitterionic crystals. The molecular chirality guarantees that the crystals will be noncentrosymmetric, and most crystals which result from this method will fall into point groups 2 or 222. A large majority of the compounds have adequate birefringence for phase matched second—and third—harmonic generation of 1.064 μm radiation. Structural differences among these compounds lead to a variety of phase matching properties, e.g., non-critical phase-matching wavelengths. Some of the crystals have nonlinearities similar to, or larger than that of urea. Moreover, as a group, these ionic crystals are mechanically harder and more stable in air than urea.

According to the present invention, frequency conversion crystals are provided in which at least one "harmonic generating unit" is attached to a chiral molecule. This crystal has the following properties. 1. The molecule, or molecular unit must be intrinsically noncentrosymmetric itself for it to be a "harmonic generating unit." 2. The "harmonic generating unit" must have relatively low energy excitations which simultaneously possess both strong 1 and 2 photon dipole transition moments with the electronic ground state. 3. The unit must be anisotropic, e.g. planar or otherwise one dimensional in geometry. 4. The unit must be transparent to visible and ultraviolet wavelengths. An optional fifth property is that the "harmonic generating unit" is ionic so that crystals of the compound can be formed as salts with readily available anions or cations.

Frequency conversion crystals, according to the present invention, are of the general formula:

$$\begin{bmatrix} & A & \\ & | & \\ D - C^* - B \\ & | & \\ & C & \end{bmatrix}^{\pm N} + j.I^{(\pm)\ n/j} + H_2O$$

where A, B, C and D have the following properties:
 (a) $A \neq B \neq C \neq D$;
 (b) A, B, C and D are members selected from the group consisting of

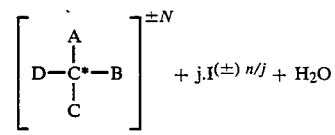

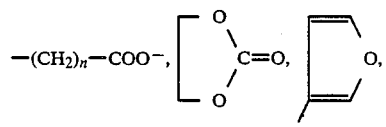

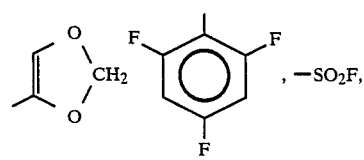

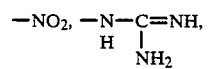

-continued

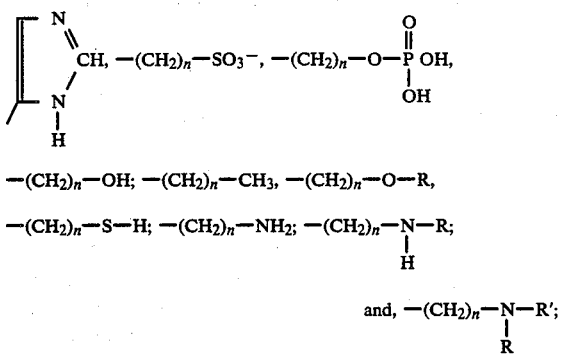

(c) at least one of A, B, C or D is ionic;
(d) at least one of A, B, C or D is selected from the group consisting of

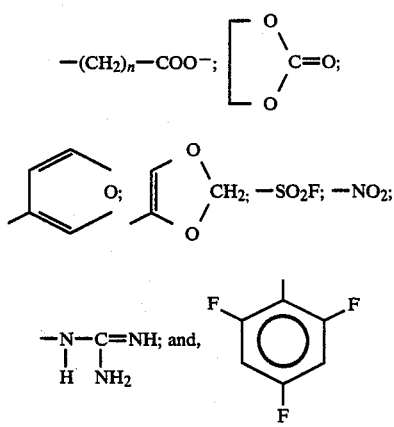

and, where I is a counterion selected from the group consisting of anions $R^-$, $Cl^-$, $Br^-$, $I^-$, $RE-C^-$, $RE-SO_3^-$, $Pl_4^\equiv$, $AsO_4^\equiv$, $BF_4^-$, $ClO_4^-$ and $NO_3^-$; cations $Li^+$, $Na^+$, $K^+$, $Rb^+$, $Cs^+$, $Tl^+$, $(NH_4)^+$, $Mg^{++}$, $Be^{++}$, $Ca^{++}$, $Sr^{++}$, $Ba^{++}$, $An^{++}$, $Cd^{++}$, $Pb^{++}$, $R-NH_3^+$, $RR'NH_2^+$ and $RR'R''NH^+$; and chiral acids and chiral bases.

Among this broad class of compounds, there are particularly preferred embodiments for doubling near infrared or visible light into the blue or ultraviolet spectral region. Specific "harmonic generating units" which haven been demonstrated to work in this regard are the carboxylate, guanadyl and imidazolyl units shown above.

Other preferred embodiments of the chiral molecules, containing a harmonic generating unit, are found among L-arginine fluoride, deuterated L-arginine fluoride, L-arginine chloride monohydrate, L-arginine acetate, dithallium tartrate, ammonium N-acetyl valine, N-acetyl tyrosine and N-acetyl hydroxyproline.

Excluded from the scope of the present invention are L-arginine phosphate, L-threonine, D-threonine, L-glutamic acid hydrochloride, diammonium tartrate, dipotassium tartrate hemihydrate, potassium malate and ammonium malate. These compounds are believed to have been described in the prior art.

The present invention provides the ability to tailor the specific crystal's phase matching properties by using certain chemical substitutions to change the dispersive properties of the refractive index in the near infrared and near ultraviolet. Among the chemical modifications are deuteration, halogenation of the chiral molecule substituent groups, and the controlled substitution of counterions.

The frequency conversion crystals can be used in combination with a fixed frequency laser source. With reference to FIG. 1, a second harmonic generator 10 can be obtained by combining a laser source 12 of coherent light radiation at a fixed fundamental frequency, a frequency conversion crystalline compound, contained within a cell 16, a device for directing the output radiation of the laser onto the crystalline compound not shown in FIG. 1 because it is contained within the laser source 12 itself, and an output channel 18 for utilizing the resulting second harmonic frequency. The frequency conversion crystals can be obtained from the class of chiral molecules identified above. One further constraint on the frequency conversion crystal is that the crystal must be transparent to radiation at both the fixed fundamental frequency of the laser source and the resulting second harmonic frequency.

As a result of the adaptability and predictability of crystals selected and prepared according to this invention, over a wide range of wavelengths, for both incident and resulting radiation, it is possible to develop a library of crystals to be used for doubling tunable dye lasers over their entire wavelength range.

EXAMPLE 1

L-Arginine fluoride is crystallized by slow cooling of an equimolar solution of L-Arginine and hydrofluoric acid from 45° C. to 20° C., or by slow evaporation of the solution at 30° C. The resulting crystal is useful as a high efficiency frequency doubler for wavelengths between 1.06 and 0.92 $\mu$m.

EXAMPLE 2

Deuterated L-Arginine fluoride is formed by twice recrystallizing L-Arginine fluoride from >95% $D_2O$, and cooling a saturated solution of this material dissolved in >95% $D_2O$ from 45° C. to room temperature. This material has slightly better efficiency than undeuterated L-Arginine fluoride near 1.06 $\mu$m because of reduced absorption.

EXAMPLE 3

L-Arginine chloride monohydrate is formed by slow cooling of a stoichiometric solution of L-Arginine and hydrochloric acid maintained at pH 2.9. This crystal is an angularly insensitive doubler for wavelengths between 0.85 and 0.75 $\mu$m.

EXAMPLE 4

N-Acetyl hydroxyproline is crystallized from a saturated aqueous solution by evaporation at 30° C. in a water bath. This crystal is an efficient frequency doubler for wavelengths 0.92–0.85 $\mu$m, and is an efficient frequency mixer for 1.064 and 0.532 $\mu$m light.

EXAMPLE 5

N-Acetyl Tyrosine crystals are grown from a saturated aqueous solution by evaporation in a water bath at 30° C. This crystal is an efficient doubler for wavelengths 0.8 to 0.7 μm, and an efficient mixer for 1.1 to 0.98 μm.

EXAMPLE 6

The ammonium salt of N-Acetyl Valine is formed by cooling a 1:1 mixture of $NH_4OH$ and N-Acetyl Valine in water. The crystal is phasematchable for doubling wavelengths as short as 0.58 μm and has a powder SHG signal larger than KDP.

EXAMPLE 7

The crystal dithallium tartrate is grown by cooling a solution of tartaric acid and excess Thallium hydroxide. This crystal has a powder SHG signal larger than quartz, and is angularly insensitive for doubling and tripling 1.064 μm light.

EXAMPLE 8

L-arginine acetate crystals are grown by cooling a solution of stoichiometric mixture of L-arginine and acetic acid in water. This crystal is an angularly insensitive doubler for 1.064 μm light.

EXAMPLE 9

An analysis of phase-matching properties was obtained using crystals made according to the protocols described in Examples 1 through 3, and KDP. Since the crystals from this class are biaxial, and usually monoclinic, the traditional wedge and prism measurements would be very slow. See, S. Kurtz, "Measurement of Nonlinear Susceptibilities," *Quantum Electronics*, Vol. IA. H. Rabin and C. Tang, eds. (Academic Press, New York, 1975). We have developed a method of directly determining the phase matching properties of small crystals. See S. Velsko, "Direct Assessment of the Phasematching Properties of New Nonlinear Materials," Proc. SPIE 681, 25 (1986). This method enables the determination of the maximum SHG efficiency of nonlinear crystals by exploring the entire phase matching locus for any frequency doubling or mixing process of interest. Table 3 provides phase matching parameters for several crystals.

TABLE 3

Properties of some ionic organic crystals for doubling 1.064 μm.

| Material | Type | $d_{eff}(pm/V)^1$ | $(cm^{-1}/rad)$ | $P_{th}(MW)$ |
|---|---|---|---|---|
| NAHP | I | 0.47 | 4900 | 430 |
|  | II | 1.0 | 1800 | 31 |
| LAF | I | 2.0 | 4900 | 21 |
|  | II | 1.5 | 4100 | 26 |
| LAAc | I | 0.36 | 4300 | 520 |
|  | II | 0.30 | 540 | 12 |
| KDP | I | $0.41^2$ | 4900 | 500 |
|  | II | 0.56 | 2500 | 70 |

[1] Maximum $d_{eff}$ for the given type.
[2] Based on $d_{36} = 0.63$ pm/V.

While chiral organic molecules do not exhibit nonlinearities as large as those found in inorganic high temperature oxides, such as barium metaborate, it is much easier to grow crystals in sizes adaptable to future inertial confinement fusion lasers.

EXAMPLE 10

The nonlinear index determines the threshold intensities for catastrophic self focusing. The index correlates strongly with the size of the linear index and its dispersion. Measurements on L-arginine phosphate indicate that $n_2$ is not significantly different that what would be predicted by refractive index scaling. Table 4 contains $n_2$ data for L-arginine phosphate, KDP and potassium titanyl phosphate (KTP) for comparison.

TABLE 4

Nonlinear refractive index ($n_2$) values for some frequency doubling crystals

| Crystal | n | $n_2(\times 10^{13} cm^3/erg)$ |
|---|---|---|
| KDP | 1.49 | 1.0 –3.6 |
| LAP | 1.55 | 1.87–3.04 |
| KTP | 1.77 | 2.5 –5.7 |

EXAMPLE 11

Laser-induced crystal damage can occur through a number of mechanisms, including thermal fracture from bulk absorption, local fracture at absorbing inclusions, or bulk photochemistry such as photorefractive damage or color center formation. See, e.g., D. Milam, "Laser Damage in Optical Crystals," in *The Laser Program Annual Report*, UCRL-50021-85, (1986); D. Eimerl, "High Average Power Second Harmonic Generation," I.E.E.E. J. Quant. Electron. QE-23, 575 (1987). While favorable bulk damage properties of organic materials are sometimes cited in the literature, there has been little systematic evidence for high damage thresholds measured under well characterized conditions. Damage tests for L-arginine phosphate and its deuterated analog L-arginine* phosphate are shown in Table 5. For comparison, tests run with KDP and DTP are also shown in Table 5. It is not presently known whether the high damage threshold of L-arginine phosphate vis a vis KDP is due to a smaller number of damaging inclusions or because the nature of the inclusions is different, or because L-arginine phosphate has better resistance to local fracture. These results are nonetheless convincing evidence that high damage thresholds can be found among organic crystals within the class of compounds according to the present invention. While KTP is apparently capable of high damage thresholds, scaling of this material to larger sizes has not proven feasible.

In this regard, resistance to optical damage refers to the number of times the surface of a crystalline material can be bombarded (shots) with laser radiation of a given power density in watts per unit area before the subject crystal shows signs of opacity. Thus, a crystal showing high resistance would require a larger number of shots than a crystal of low resistance for the same power density of the incident laser beams.

TABLE 5

Damage thresholds of nonlinear crystals for 1 ns pulses at 1.064 μm

| Crystal | Available Size | $J_D(J/cm^2)$ |
|---|---|---|
| KDP | $10 \times 10 \times 10$ cm$^3$ | 5±1 |
| LAP | $1 \times 2 \times 3$ | 10±2 |
| KTP | $0.5 \times 0.5 \times 0.5$ | 13±2 |

While this invention has been described with reference to specific embodiments illustrated and described for selecting frequency conversion crystals, modifications and changes of the apparatus, parameters and materials will become apparent to those of ordinary skill in the art. It is intended to cover all such modifications and changes which come within the scope of this invention.

We claim:

1. A frequency conversion crystal useful for doubling near infrared or visible light into the blue or ultraviolet spectral region, comprising a chiral carbon (C*) molecule having the general formula:

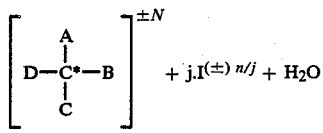

where A, B, C and D have the following properties:
(a) A≠B≠C≠D;
(b) A, B, C and D are members selected from the group consisting of

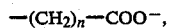

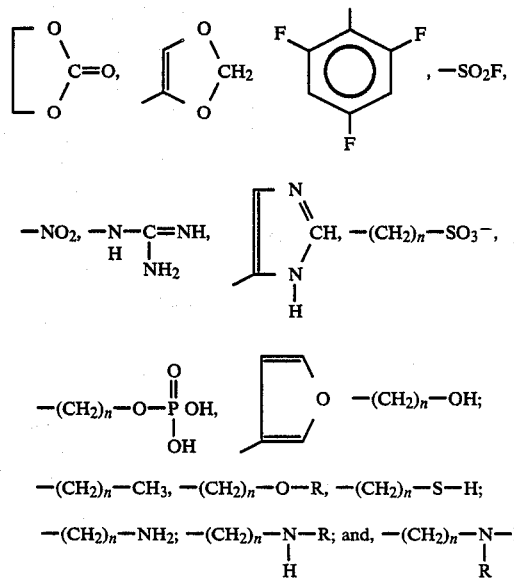

(c) at least one of A, B, C or D is ionic;
(d) at least one of A, B, C or D is selected from the group consisting of

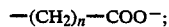

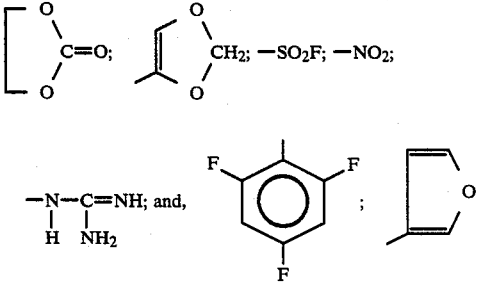

and, where I is a counterion selected from the group consisting of anions F', Cl−, Br−, I−, R-COO−, R-SO₃−, PO₄≡, BF₄=, ClO₄− and NO₃−; cations Li+, Na+, Rb+, Cs+, Tl+, (NH₄)+, Mg++, Be++, Ca++, Sr++, Ba++, An++, Cd++, Pb++, R-NH₃+, RR'NH₂+ and RR'R"NH+, chiral acids and chiral bases, said chiral carbon (C*) molecule exclusive of L-arginine phosphate, diammonium tartrate, L-threonine, D-threonine, L-glutamic acid hydrochloride and dipotassium tartrate hemihydrate.

2. A frequency conversion crystal as in claim 1 selected from the group of chiral carbon (C*) molecules consisting of L-arginine fluoride, deuterated L-arginine fluoride, L-arginine chloride monohydrate, L-arginine acetate, dithallium tartrate, ammonium N-acetyl valine, N-acetyl tyrosine and N-acetyl hydroxyproline.

3. A frequency conversion crystal as in claim 1 wherein one or more hydrogen atoms of said chiral molecule are replaced by deuterium atoms.

4. A frequency conversion crystal as in claim 1 wherein one or more hydrogen atoms of any aliphatic constituents of said chiral carbon (C*) molecule are systematically substituted by fluorine, chlorine or bromine, to thereby change radiation dispersive properties of said frequency conversion crystal.

5. A frequency conversion crystal as in claim 1 wherein said counterions I are balanced t form a mixed counterion system to thereby control radiation dispersive properties of said frequency conversion crystal.

6. A frequency doubling crystal comprising an organic compound including in combination a chiral carbon (C*) atom and a harmonic generating member selected from the group consisting of

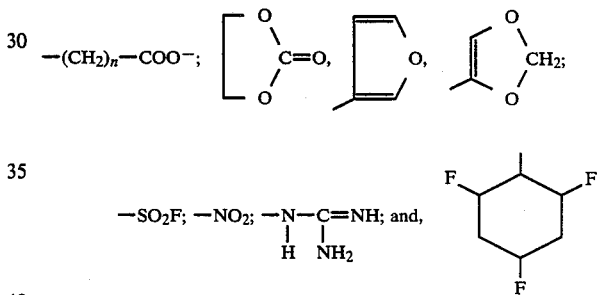

said harmonic generating member chemically bonded to said chiral carbon (C*) atom, said frequency doubling crystal exclusive of L-arginine phosphate, diammonium tartrate, L-threonine, D-threonine, L-glutamic acid hydrochloride, and dipotassium tartrate hemihydrate.

7. A frequency doubling crystal as in claim 6 selected from the group of organic compounds consisting of L-arginine fluoride, deuterated L-arginine fluoride L-arginine chloride monohydrate, L-arginine acetate, dithallium tartrate, ammonium N-acetyl valine, N-acetyl tyrosine and N-acetyl hydroxyproline.

8. A frequency doubling crystal as in claim 6 wherein one or more hydrogen atoms of said organic compound are replaced by deuterium atoms.

9. A frequency doubling crystal as in claim 6 wherein one or more hydrogen atoms of any aliphatic constituents of the organic compound are systematically substituted by fluorine, chlorine or bromine, to thereby change radiation dispersive properties of said frequency doubling crystal, according to the frequency of radiation incident upon said frequency doubling crystal.

10. A frequency doubling crystal as in claim 6 wherein any counterions are balanced to form a mixed counterion system to thereby control radiation dispersive properties of said frequency doubling crystal.

11. A frequency conversion crystal selected from the group of organic compounds consisting of L-arginine fluoride, detuerated L-arginine fluoride, L-arginine chloride monohydrate, L-arginine acetate, dithallium tartrate, ammonium N-acetyl valine, N-acetyl tyrosine, and N-acetyl hydroxyproline.

12. A frequency conversion crystal as in claim 11 wherein one or more hydrogen atoms of said organic compound are replaced by deuterium atoms.

13. A frequency conversion crystal as in claim 11 wherein one or more hydrogen atoms of any aliphatic constituents of the organic compound are systematically substituted by fluorine, chlorine or bromine, to thereby change radiation dispersive properties of said frequency conversion crystal, according to the frequency of radiation incident upon said frequency conversion crystal and to any predetermined frequency conversion.

14. A frequency conversion crystal as in claim 11 wherein the counterions are balanced to form a mixed counterion system to thereby control radiation dispersive properties of said frequency conversion crystal.

15. In a second harmonic generator comprising a laser source of coherent light radiation at a fixed fundamental frequency, an organic molecular crystalline compound, means for directing the output radiation of the laser onto the compound, and output means for utilizing a second harmonic frequency, the improvement comprising the use of a frequency conversion crystal as in claim 1, said crystal compound being transparent to radiation at said fixed fundamental frequency and said second harmonic frequency.

16. In a second harmonic generator comprising a laser source of coherent light radiation at a fixed fundamental frequency, an organic molecular crystalline compound, means for directing the output radiation of the laser onto the compound, and output means for utilizing a second harmonic frequency the improvement comprising the use of a frequency doubling crystal as in claim 6, said crystal compound being transparent to radiation at said fixed fundamental frequency and said second harmonic frequency.

17. In a second harmonic generator comprising a laser source of coherent light radiation at a fixed fundamental frequency, an organic molecular crystalline compound, means for directing the output radiation of the laser onto the compound, and output means for utilizing a second harmonic frequency, the improvement comprising the use of a frequency conversion crystal as in claim 11 said crystal compound being transparent to radiation at said fixed fundamental frequency and said second harmonic frequency.

18. A method for generating a second harmonic response from a coherent light radiation at a fixed fundamental frequency comprising the steps of:
providing a laser source of coherent light radiation at a fixed fundamental frequency;
providing a frequency conversion crystal as in claim 1, means for directing the output radiation of the laser onto the compound, and output means for utilizing a resultant second harmonic frequency;
directing the output radiation of the laser source upon the frequency conversion crystal; and,
obtaining the second harmonic frequency of said laser source fixed fundamental frequency from said frequency conversion crystal; and,
transmitting said converted laser source radiation to said output means.

19. A method for generating a second harmonic response from a coherent light radiation at a fixed fundamental frequency comprising the steps of:
providing a laser source of coherent light radiation at a fixed fundamental frequency;
providing a frequency doubling crystal as in claim 6, means for directing the output radiation of the laser onto the compound, the output means for utilizing a resultant second harmonic frequency;
directing the output radiation of the laser source upon the frequency conversion crystal; and,
obtaining the second harmonic frequency of said laser source fixed fundamental frequency from said frequency conversion crystal; and,
transmitting said converted laser source radiation to said output means.

20. A method for generating a second harmonic response from a coherent light radiation at a fixed fundamental frequency comprising the steps of:
providing a laser source of coherent light radiation at a fixed fundamental frequency;
providing a frequency conversion crystal as in claim 11, means for directing the output radiation of the laser onto the compound, and output means for utilizing a resultant second harmonic frequency;
directing the output radiation of the laser source upon the frequency conversion crystal; and,
obtaining the second harmonic frequency of said laser source fixed fundamental frequency from said frequency conversion crystal; and,
transmitting said converted laser source radiation to said output means.

* * * * *